(12) United States Patent
Ngo

(10) Patent No.: US 6,863,445 B2
(45) Date of Patent: Mar. 8, 2005

(54) ADAPTER WITH CAP FOR FIBER OPTIC CONNECTOR

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/794,841

(22) Filed: Mar. 5, 2004

(65) Prior Publication Data

US 2004/0171283 A1 Sep. 2, 2004

Related U.S. Application Data

(63) Continuation of application No. 10/252,811, filed on Sep. 23, 2002, now Pat. No. 6,702,477.

(51) Int. Cl.[7] .................................................. G02B 6/38
(52) U.S. Cl. ............................ 385/55; 385/58; 385/70; 385/72
(58) Field of Search .......................... 385/55, 58, 70, 385/72, 60

(56) References Cited

U.S. PATENT DOCUMENTS

| | | | |
|---|---|---|---|
| 922,605 A | 5/1909 | Lenahan | |
| 4,699,458 A | 10/1987 | Ohtsuki et al. | 350/96.21 |
| 5,317,663 A * | 5/1994 | Beard et al. | 385/70 |
| 5,372,515 A | 12/1994 | Miller et al. | 439/138 |
| 5,381,498 A | 1/1995 | Bylander | 385/83 |
| 5,506,922 A | 4/1996 | Grois et al. | 385/75 |
| 5,708,745 A | 1/1998 | Yamaji et al. | 385/92 |
| 5,711,053 A | 1/1998 | Hafner | 16/380 |
| 5,719,977 A | 2/1998 | Lampert et al. | 385/60 |
| 5,737,464 A | 4/1998 | Underwood et al. | 385/72 |
| 5,774,612 A * | 6/1998 | Belenkiy et al. | 385/72 |
| 5,825,955 A | 10/1998 | Ernest et al. | 385/79 |
| 5,838,855 A * | 11/1998 | Stephenson | 385/53 |
| 5,881,191 A | 3/1999 | Liberty | 385/58 |
| 5,885,103 A | 3/1999 | Ernolf et al. | 439/579 |
| 5,887,095 A | 3/1999 | Nagase et al. | 385/58 |
| 5,909,526 A | 6/1999 | Roth et al. | 385/78 |
| 5,923,805 A | 7/1999 | Anderson et al. | 385/86 |
| 5,940,561 A | 8/1999 | Dean | 385/60 |
| 6,004,043 A | 12/1999 | Abendschein et al. | 385/76 |
| 6,017,229 A | 1/2000 | Tulley et al. | 439/144 |
| 6,039,585 A | 3/2000 | Kim et al. | 439/137 |
| 6,079,881 A | 6/2000 | Roth | 385/76 |
| 6,081,647 A | 6/2000 | Roth et al. | 385/139 |
| 6,097,873 A * | 8/2000 | Filas et al. | 385/140 |
| 6,108,482 A | 8/2000 | Roth | 385/139 |
| 6,126,325 A | 10/2000 | Yamane et al. | 385/92 |
| 6,154,597 A | 11/2000 | Roth | 385/139 |
| 6,179,479 B1 | 1/2001 | Crivelli | 385/73 |
| 6,193,420 B1 | 2/2001 | Sikorsky, Jr. | 385/55 |
| 6,243,526 B1 | 6/2001 | Garibay et al. | 385/135 |
| 6,247,849 B1 | 6/2001 | Liu | 385/55 |
| 6,283,640 B1 | 9/2001 | Stephenson et al. | 385/58 |
| 6,315,590 B1 | 11/2001 | Grois et al. | 439/248 |
| 6,367,984 B1 | 4/2002 | Stephenson et al. | 385/53 |
| 6,375,480 B1 | 4/2002 | Chen et al. | 439/142 |
| 6,424,758 B1 | 7/2002 | Cheng | 385/16 |
| 6,425,694 B1 | 7/2002 | Szilagyi et al. | 385/76 |
| 6,579,013 B2 | 6/2003 | Gaio et al. | 385/60 |
| 6,599,024 B2 * | 7/2003 | Zimmel | 385/73 |
| 2002/0181888 A1 * | 12/2002 | Zimmel | 385/72 |

\* cited by examiner

*Primary Examiner*—Chandrika Prasad
(74) *Attorney, Agent, or Firm*—Woodcock Washburn LLP

(57) ABSTRACT

An adapter for connecting opposing fiber optic connectors includes a housing having a through aperture about which a post is formed. An alignment sleeve is disposed in and retained by the post. A plastic cap is disposed over an end of the post. The plastic cap may include a lip for retaining the alignment sleeve, a conical or other oblique surface for self-aligning on a like surface of the post, and a latch that clips the cap into recesses in the housing. The post may include a recess for receiving the latch members.

35 Claims, 7 Drawing Sheets

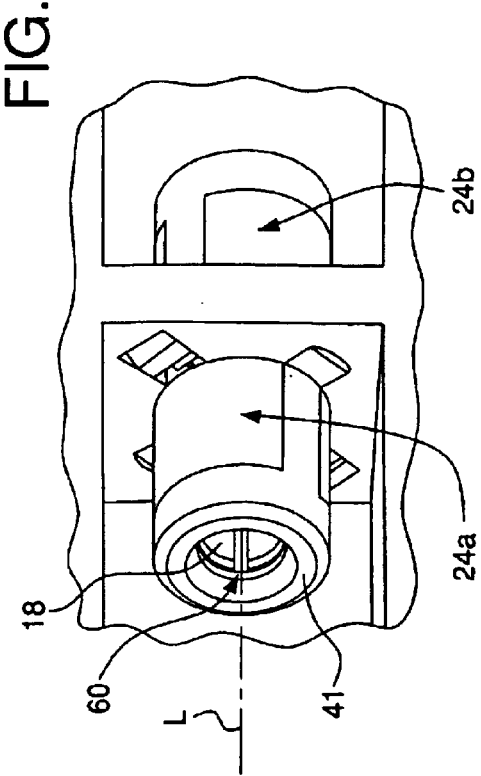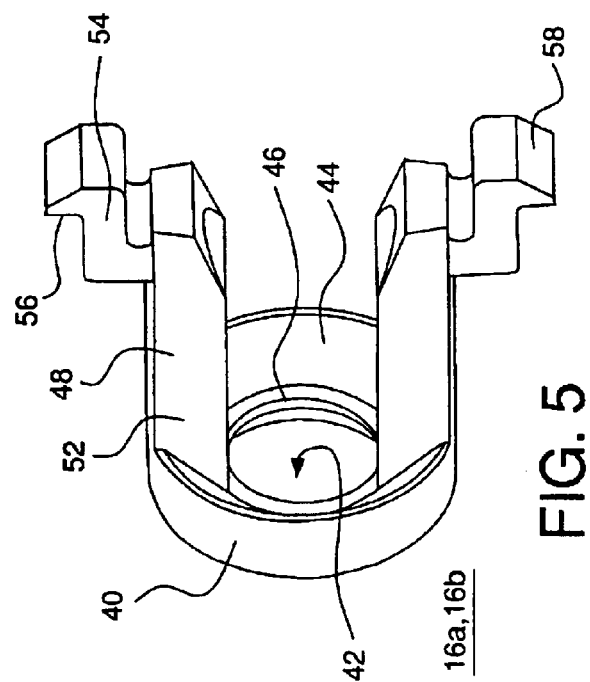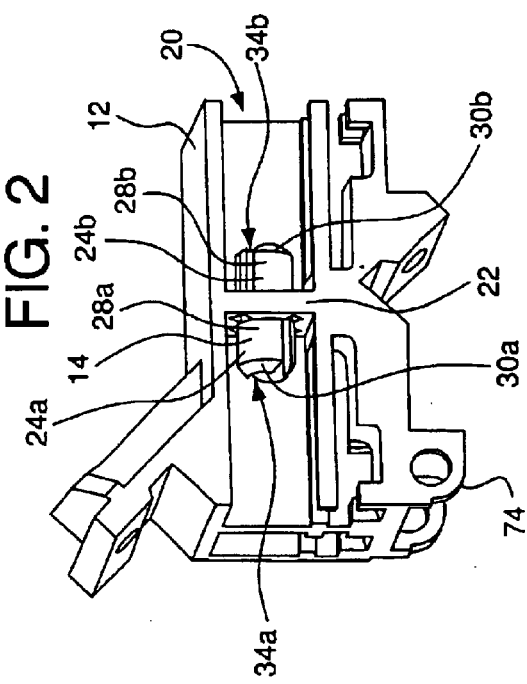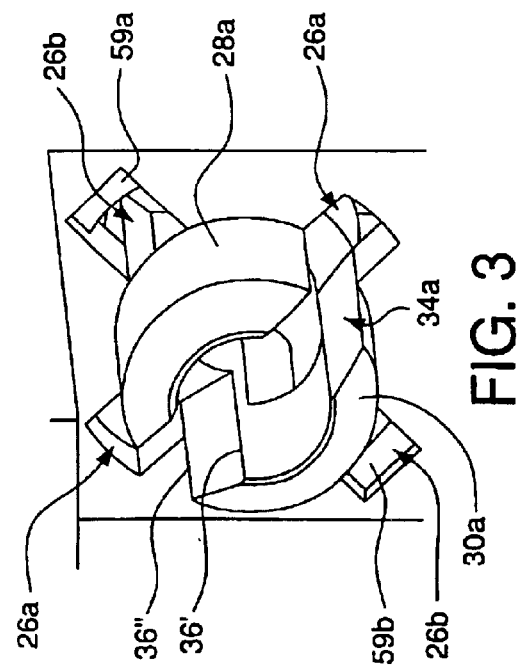

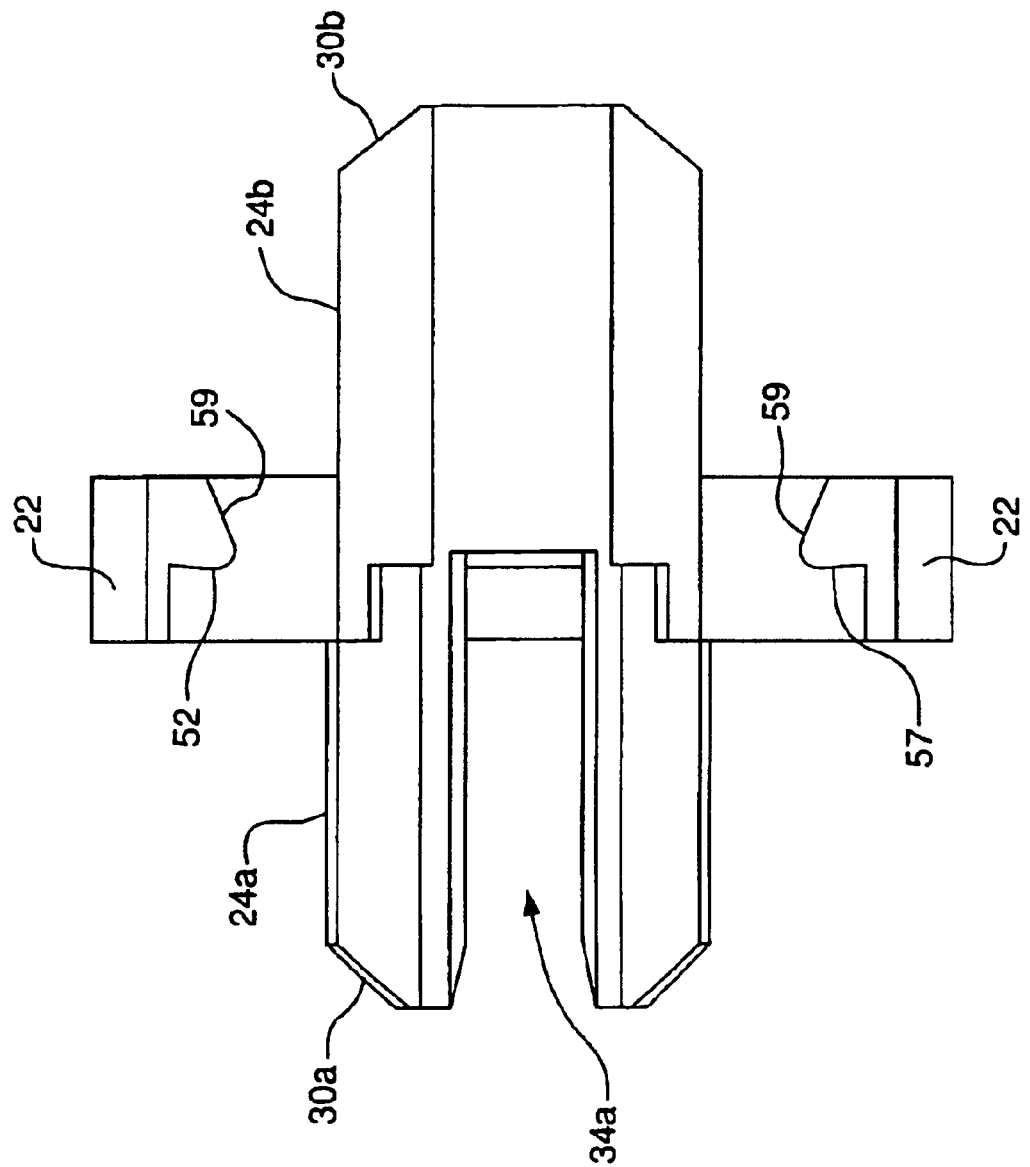

ADAPTER WITH CAP FOR FIBER OPTIC CONNECTOR

This a continuation of U.S. patent application No. 10/252,811 filed Sept. 23, 2002 now U.S. Pat. No. 6,702,477.

BACKGROUND

The present invention relates to connectors, and more particular to adapters for connecting fiber optic connectors.

A conventional fiber optic connector typically includes a body, a plastic ferrule, and a glass fiber disposed concentrically within the ferrule. Each connector may include single or multiple ferrules and fibers. Alignment of opposing fibers upon mating one connector to another is important for proper signal transmission.

Adapters for mating a pair of fiber optic connectors often include a housing, a post disposed in the housing, and an alignment sleeve disposed within the post. To shield against electromagnetic interference, among other reasons, the adapter housing is often formed of a conductive or shielding material, and a shielded, hinged cover often covers openings into which fiber optic connectors may be inserted. The alignment sleeve of the adapter receives each of the opposing connectors' ferrules, and often may be formed of a material comprising a ceramic. A longitudinal slot in the alignment sleeves facilitates insertion, retention, and withdrawal of the ferrules.

Centering the alignment sleeve relative to the fiber centerline and accurate angular alignment are important to the alignment of the opposing connectors. Misalignment (either angularly and relative to a centerline offset), pinching, or deformation of the alignment sleeve may result in high insertion and withdrawal forces, poor signal transmission, and/or other detriments.

The adapter posts typically extend over the ends of alignment sleeve in order to retain it. In such a configuration, contamination of the connector sometimes occurs because of the contact between the dissimilar materials of the ferrule and the post. For example, a plastic ferrule that strikes the front face of a post that is zinc-plated, or the like, during the insertion process may produce particulate that interferes with optical transmission, prevents face-to-face contact of opposing ferrules, and/or other detriments.

Further, the connector and adapter industry is competitive such that adapter configuration must be amenable to modern, inexpensive production techniques.

SUMMARY

An adapter for receiving and connecting together a pair of fiber optic connectors is provided. The adapter comprises a housing including a post supported therein, an alignment sleeve disposed in the post, and a plastic cap disposed proximate an end of the post. The post includes a through-aperture and opposing openings formed therein. The cap includes an opening formed therein, a lip disposed proximate the opening, a contact surface disposed against a mating surface of the post, and a latch including a clip surface in contact with the housing for securing the cap to the post. The lip is disposed over an end of the alignment sleeve to limit longitudinal movement of the alignment sleeve. The cap substantially covers an end of the post such that the ferrule contacts the cap during insertion thereof. Such contact may diminish contamination of the fiber optic connection by the post material.

The latch arms fit into notches formed in the posts, and each surface has a draft or wedge shape that prevents the latch arms from moving radially outwardly. Preferably the housing and post are integrally formed of a metallic material that is die cast, and includes frusto-conical ends. The cap preferably includes frusto-conical inboard surfaces that mate to the frusto-conical ends of the posts. Thus, the cap may be self-aligning.

BRIEF DESCRIPTION OF THE FIGURES

FIG. 2 is a perspective cut-away view showing a portion of an embodiment of the adapter according to an aspect of the present invention;

FIG. 3 is an enlarged perspective view of a portion of the adapter shown in FIG. 2;

FIG. 5 is an enlarged perspective view of another portion of the adapter that corresponds to the portion shown in FIG. 3;

FIG. 7 is an enlarged perspective view of an assembly formed by the portions of the adapter shown in FIG. 3 and FIG. 5;

FIG. 8A is a longitudinal cross-sectional view of the portion of the adapter shown in FIG. 3;

DESCRIPTION OF PREFERRED EMBODIMENTS

Figure 1:
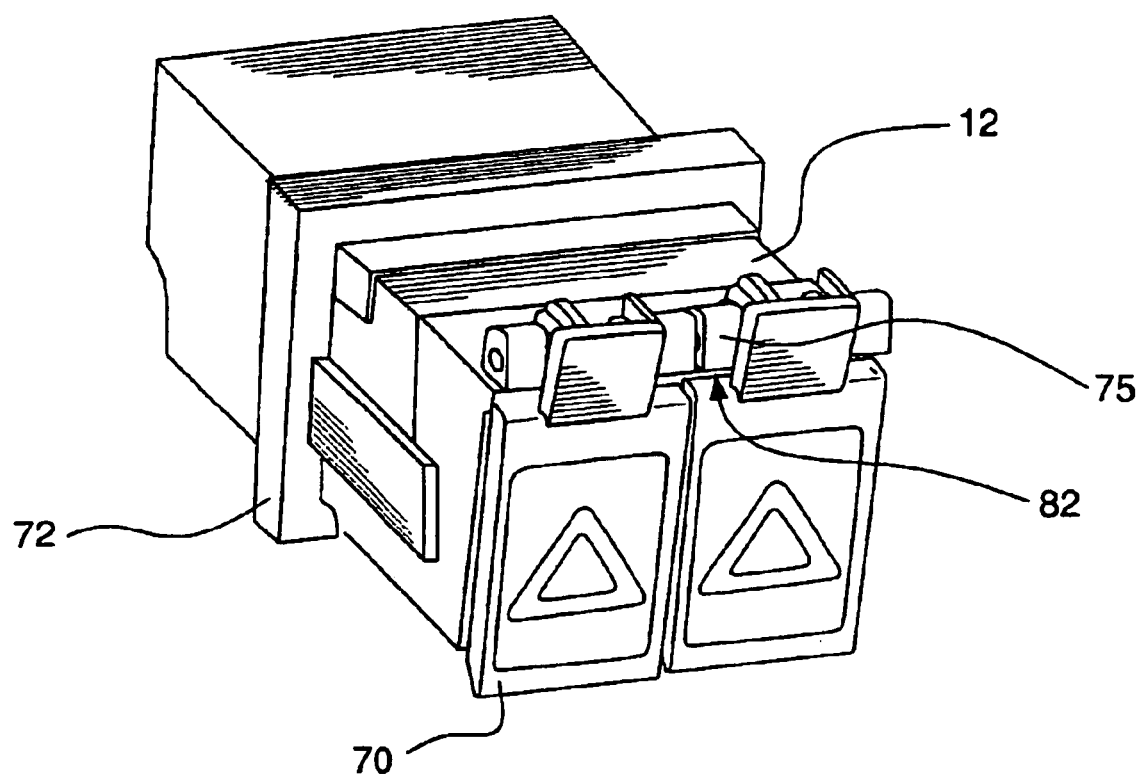
FIG. 1 is perspective view of an adapter with which the present invention may be employed.
Figure 4:
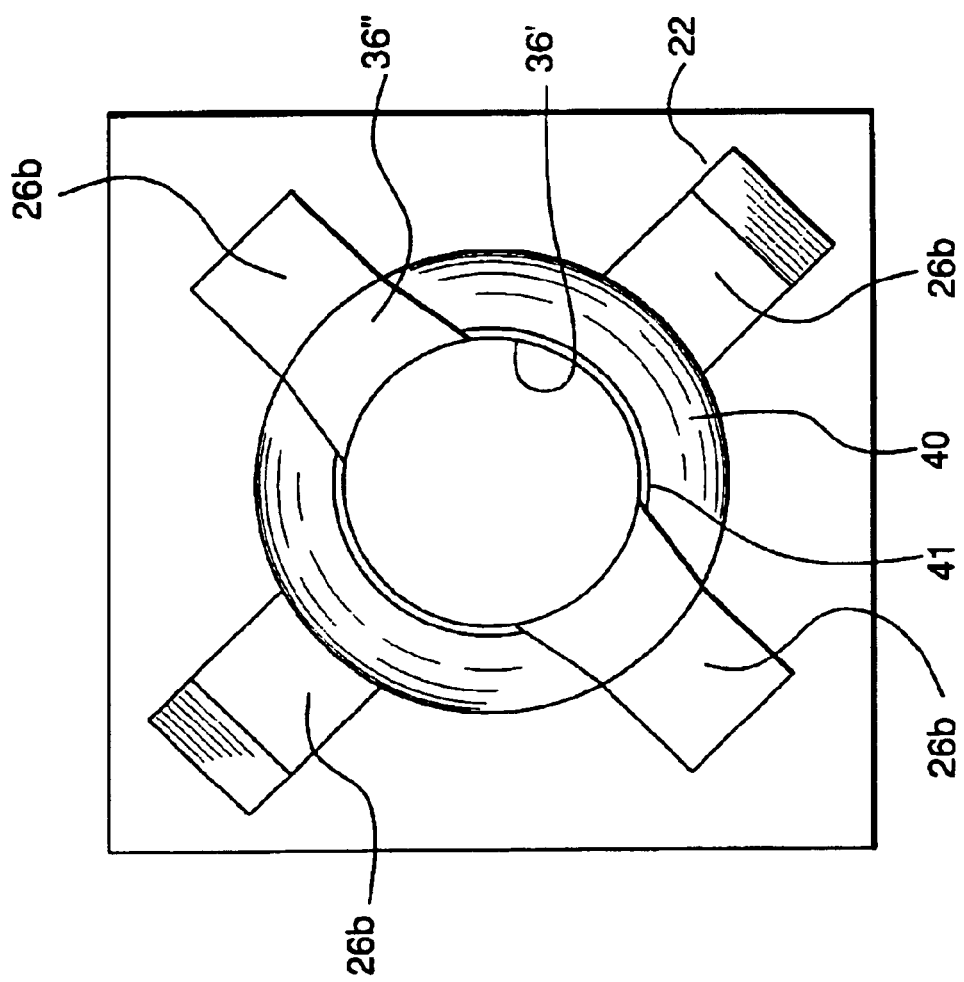
FIG. 4 is an enlarged end view of the portion of the adapter shown in FIG. 3.
Figure 6:
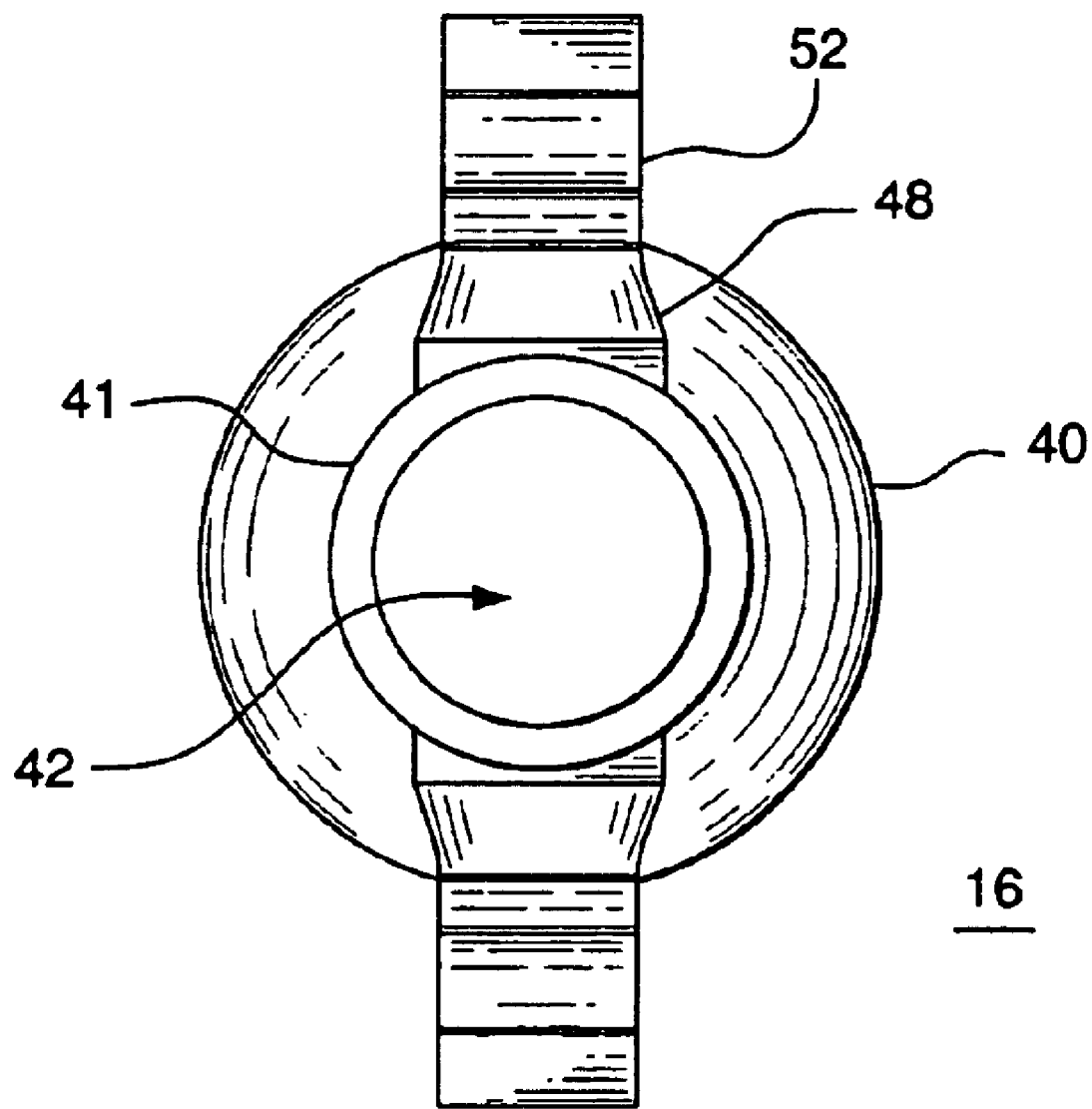
FIG. 6 is an end view of the portion of the adapter shown in FIG. 5.

An adapter 10 according to an aspect of the present invention includes a housing 12, a post 14, at least one plastic cap, such as caps 16a and 16b, and an alignment sleeve 18. A duplex adapter is employed to illustrate aspects of the present invention, although the present invention is not limited to any particular quantity of adapter apparatus. Referring to the Figures to illustrate an embodiment of the present invention, FIG. 1 shows an exterior view of a housing 12. Housing 12 includes a through-opening 20, which is best shown in FIG. 2.

As best shown in FIGS. 2 through 4 and 7, housing 12 includes a bulkhead 22 that partially interrupts through-opening 20 and that supports post 14. Preferably, housing 12, post 14, and bulkhead 22 are integrally formed by die casting of a metallic or electromagnetic shielding material. Conventional die casting techniques may be employed to integrally cast components 12, 14, and 22 according to conventional industry tolerances. The present invention is not limited to forming post 14 integrally with housing 12, but rather also encompasses any assembly techniques. Further, the present invention is not limited to any particular materials or manufacturing techniques.

The post 14 includes opposing first and second post portions 24a and 24b that extend outwardly from bulkhead 22. The post portions 24a and 24b are illustrated as substantially identical or mirror images, although the present invention is not limited to such a configuration. For convenience of illustration, the features of each post 24a and 24b will be referred to herein by reference numerals without appended letter designation, and a letter designation will be appended to a particular feature when referring to the feature of a particular one of posts 24a and 24b where beneficial to the understanding of the description. Each one of posts 24a and 24b includes a substantially cylindrical portion 28. Preferably, the distal end of cylindrical portion 28 includes a surface that is oblique, in transverse cross section, relative to longitudinal centerline L. For example, as shown in the Figures, the distal end of each cylindrical portion 28 is formed substantially in the shape of a frustum 30 of a right circular cone.

Cylindrical portion 28 and the frusto-conical portion 30 are provided with notches 34 formed therein. As best shown in FIG. 2 and FIG. 7, notches 34 preferably are formed in opposing sides of post 24a. Each of notches 34 includes an inboard portion 36' and an outboard portion 36". Preferably, inboard portion 36' has a width, in transverse cross section, that is larger than the width of outboard portion 36", thereby forming a draft slot or a key slot.

Again employing letters appended to the reference numerals to refer to particular structure corresponding to the first and second posts 24a and 24b, a pair of first recesses or windows 26a is formed in bulkhead 22 on opposing sides of first post 24a. Similarly, a pair of second recesses or windows 26b is formed in bulkhead 22 on opposing sides of second post 24b. Preferably, first windows 26a are spaced approximately 180 degrees apart and are in line with notches 34a of first post 24a. Likewise, second windows 26b are spaced approximately 180 degrees apart and are in line with notches 34b of second post 24b. First windows 26a are spaced apart from second windows 26b by approximately 90 degrees such that first windows 26a are equidistant from second windows 26b.

Referring to FIGS. 5 through 8A and 8B, and again only employing a letter designation to refer to a particular one of caps 16a and 16b, cap 16 includes a ring 40 in which an aperture 42 is formed. Ring 40 forms a front face 41 on an outboard side thereof, and a contact surface 44 on an underside thereof. Contact surface 44 includes a surface that is oblique, in transverse cross section, relative to longitudinal centerline L. For example, as shown in the Figures, contact surface 44 forms a frustum of a right circular cone that substantially matches the configuration of post frusto-conical portion 30. A lip 46 is formed on contact surface 44 and protrudes radially inwardly relative to aperture 42.

A pair of opposing latch arms 48 extend from ring 40, and include a longitudinally oriented portion 52 and a latch means, such as latch 54, disposed proximate a distal end of longitudinal member 52. Member 52 preferably has, in transverse cross section, a draft or key shape that substantially matches the cross-sectional shape of notch 34. Latch 54 is capable of radial, spring-like movement. For example, longitudinal member 52, which preferably is cantilevered from ring 40, is flexible to enable the spring-like movement of latch 54. Latch 54 includes a clip surface 56 disposed thereon.

Figure 8B:
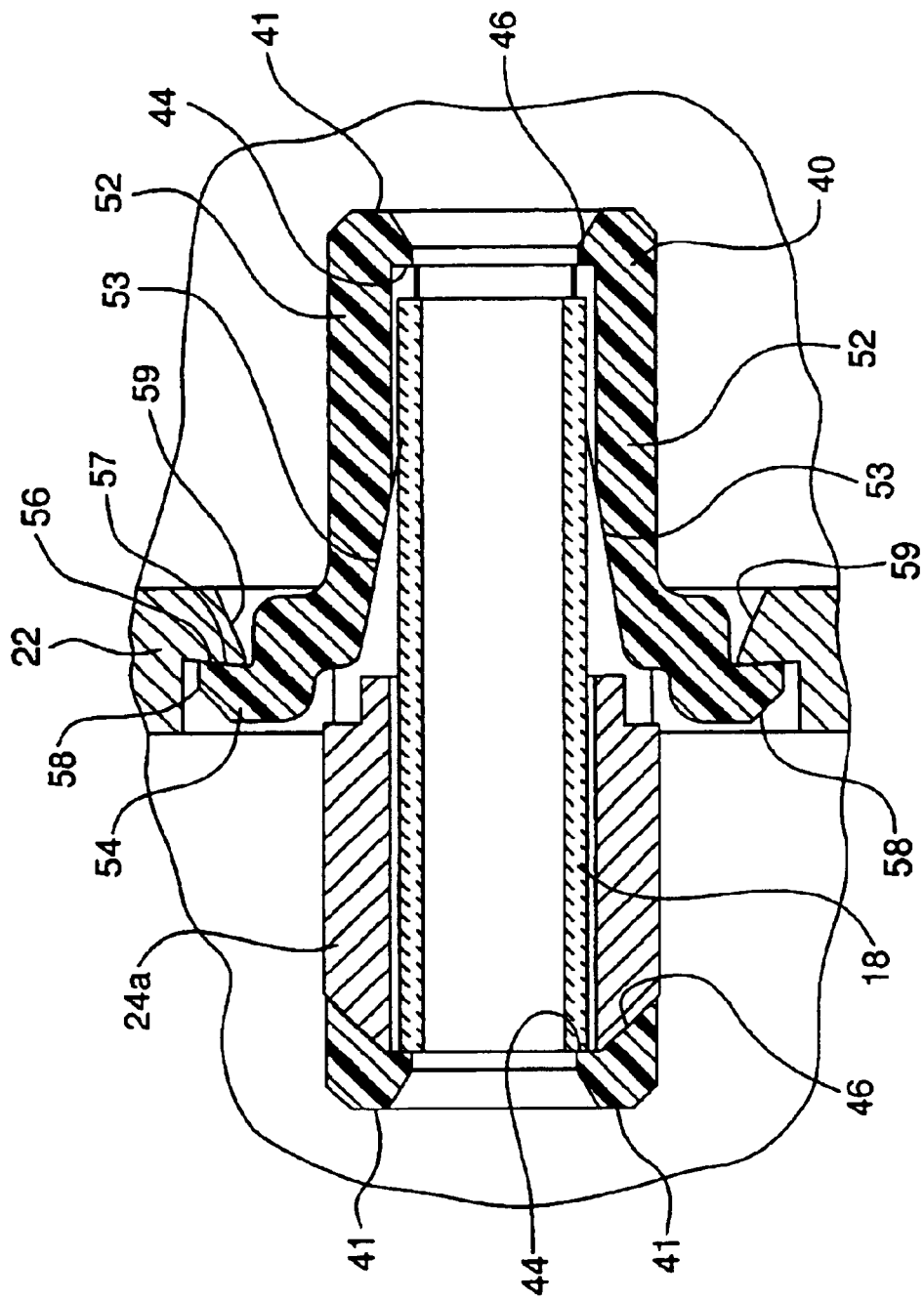
FIG. 8B is a longitudinal cross-sectional view of the portion of the assembly shown in FIG. 7.

As best shown in FIG. 8B, the radially inboard side of the longitudinal portion 52 may include a taper 53, which facilitates the inward deflection of the distal end of latch 54 during insertion of cap 16a and 16b through windows 26a and 26b, as explained more fully below.

Alignment sleeve 18 is disposed within posts 24a and 24b and longitudinally restrained by lips 46a and 46b. Alignment sleeve 18, which may be formed of a ceramic or other suitable material as understood by persons familiar with adapter technology and materials, preferably is cylindrical and includes a longitudinal slot 60 (FIG. 7) formed therein.

To assembly caps 16a and 16b and alignment sleeve 18 with posts 24a and 24b, alignment sleeve 18 may be inserted through one of the post openings 32a or 32b. The internal diameter of posts 24a and 24b are sufficiently large to receive alignment sleeve 18 according to conventional manufacturing considerations. Caps 16a and 16b may be aligned such that longitudinal members 52 are aligned with notches 34. As caps 16a and 16b are applied to posts 24a and 24b, respectively, longitudinal members 52 slide into notches 34 until a distal tip of latch 54 extends through windows 26a and 26b. A tapered portion 58 (FIG. 5) of the out board side of the distal tip of latch 54 strikes a corresponding tapered portion or ramp 59 (FIG. 3) formed proximate bulkhead 22 on a radially outboard side of windows 26.

The draft surfaces of notches 34 and longitudinal members 52 are oriented to enable members 52 to flex or deflect radially inwardly and restrain radial outward deflection of latch arms 48. The tapered surfaces 58 and 59 are oriented to urge latch 54 radially inwardly upon contact therebetween (that is, near the full-insertion position of caps 16a and 16b). Thus, latch arms 48 flex radially inwardly in response to urging of latch tapered surface 58 against housing tapered surface 59, thereby enabling latch 54 to move past housing tapered surface 59. Latch contact surface 56 seats onto a corresponding contact surface 57 (FIG. 8B) of housing 12.

The draft surfaces of notches 34 and longitudinal members 52 restrain latch arms 48 from moving radially outwardly while caps 16a and 16b are latched, which facilitates coupling with a connector, such as a conventional LC connector. In this regard, posts 24a and 24b are insertable into the annulus of such a conventional connector, such as an LC connector, between its housing and ferrule without interference by the latch arms 48 of caps 16a and 16b.

Preferably, lips 46a and 46b lightly touch alignment sleeve 18 or form a slight gap therebetween to enable alignment sleeve to self-align, if necessary, upon insertion of a connector from either end thereof. The present invention also encompasses lips 46a and 46b tightly contacting sleeve 18 to secure sleeve 18 therebetween in a press fit. Integrally forming post 14 with housing 22 facilitates alignment of sleeve 18 by, for example, eliminating any pinching or misalignment that may be formed between non-integrally formed posts.

Face 41 of caps 16a and 16b provides a plastic surface against which the plastic ferrule of the connector may strike upon insertion of the connector into adapter 10 until the ferrule locates cap aperture 42. Because a plastic surface (that is, of the ferrule) strikes another plastic surface (that is, of cap 16), as distinguished from a metallic or metallic coated surface, metal contamination of the interface between opposing optical fibers and metal interference between the abutting faces of the opposing ferrules of the connectors is eliminated or diminished.

Figure 9:
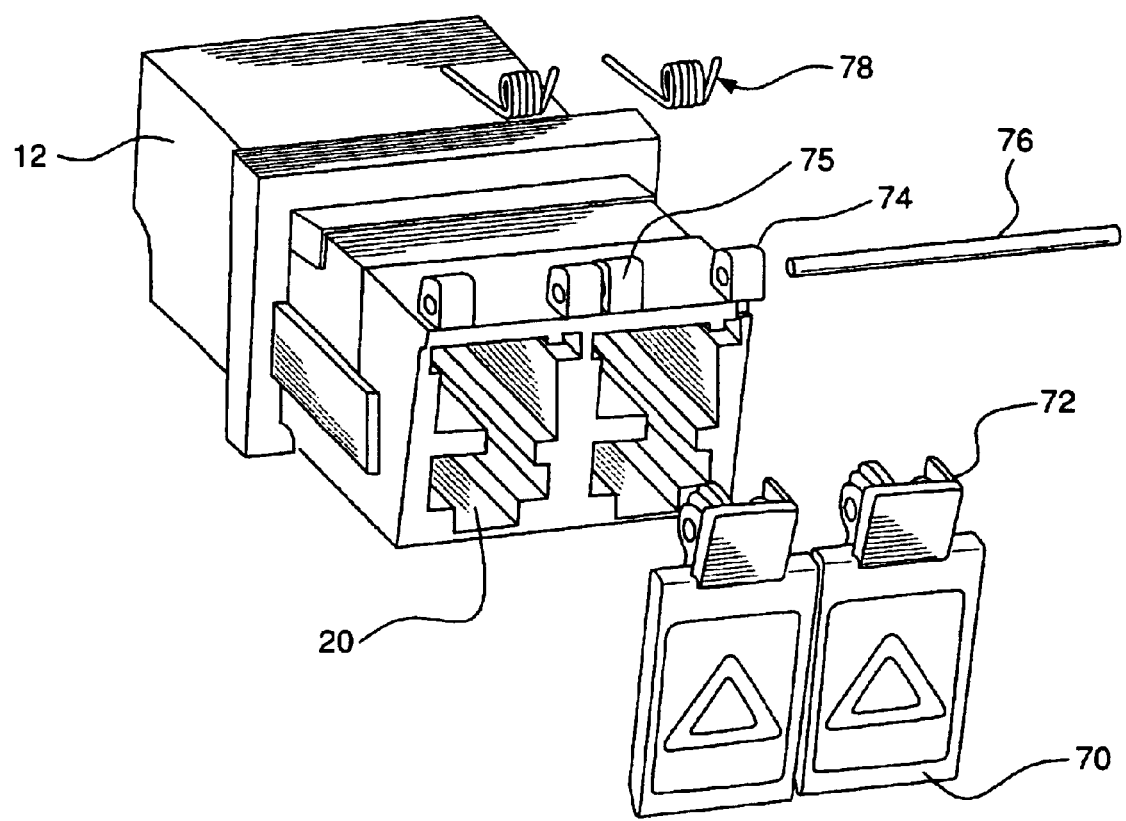
FIG. 9 is an exploded, perspective view of the adapter shown in FIG. 1.

Referring again to FIG. 1 and FIG. 9, adapter 10 includes a pair of shutter doors 70 that are coupled to housing 12 by a pin 76. Housing 12 includes a pair of outer housing lugs 74 that are insertable into a pair of door lugs 72. A center housing lug 75 is disposed on the housing between outer housing lugs 74. A torsion spring 78 is disposed between each one of the outer housing lugs 74 and the inner housing lug 75. Apertures of lugs 72, 74, and 75 and of springs 78 are aligned to enable pin 76 to be disposed therethrough. Pin 76 is held in place by kink that is formed by deforming a portion of pin 76. For example, as shown in FIG. 1, center housing lug 75 is provided with an aperture for accessing pin 76. A punch tool (not shown in the Figures, but which may be any pointed object of proper size) may be inserted into the aperture in center lug 75 to form the kink in pin 76.

The present disclosure illustrates the invention by describing a particular embodiment and referring to some advantages. The present invention, however, is not limited to such an embodiment, but rather encompasses any adapter, connector, and the like that incorporates the present invention, as recited in the appended claims. For example, a duplex adapter is shown, and the present invention encompasses any type of single or multiple device. Further, the present invention is not limited to employing a bulkhead, but rather encompasses any means to support a post or like structure. The post, or like structure, need not by cylindrical, but rather may be square or rectangular, oval or elliptical, or any combination of straight and curved portions in transverse cross section. Other variations will be apparent to persons familiar with connector and adapter technology in view of the present disclosure, and such variations are encompassed by the present invention, as provided in the appended claims.

What is claimed is:

1. An adapter for receiving and connecting together a pair of fiber optic connectors, said adapter comprising:
    a unitary metallic housing including a post integrally formed therein, said post being unitary so as to facilitate alignment;
    an alignment sleeve disposed in the post; and
    a pair of opposing plastic caps disposed over the post ends.

2. The adapter of claim 1 wherein the post includes a through-aperture and opposing openings formed therein, and the caps include:
    an opening formed therein;
    a lip disposed proximate the respective opening, the lip disposed over an end of the alignment sleeve to limit longitudinal movement of the alignment sleeve; and
    a contact surface proximate the lip and disposed against a mating surface of the post;
    wherein the alignment sleeve receives a pair of ferrules at opposing ends thereof.

3. The adapter of claim 2 wherein the cap substantially covers an end of the post, wherein the ferrule contacts the cap during insertion thereof and such contact diminishes contamination upon connecting together the fiber optic connectors.

4. The adapter of claim 1 wherein the housing and post are integrally formed of a die cast material.

5. The adapter of claim 2 wherein each cap includes a latch including a clip surface in contact with the housing for securing the cap to the post.

6. The adapter of claim 2 wherein the mating surface of the post is substantially frustoconical and disposed on a distal end of the post.

7. The adapter of claim 6 wherein the contact surface of each cap is substantially frustoconical.

8. An adapter for receiving and connecting a pair of fiber optic connectors, said adapter comprising:
    a housing including an elongate structure for receiving an alignment sleeve, said elongate structure having a pair of opposing ends; and
    a pair of opposing plastic caps disposed over the ends of said structure such that contamination caused by insertion of the connectors is diminished.

9. The adapter of claim 8 wherein the elongate structure is a post, the caps being disposed over opposing ends of the post.

10. The adapter of claim 9 wherein the post includes opposing openings formed therein and a through-aperture, and each cap includes:
    an opening formed therein;
    a lip disposed proximate the cap opening, the lip disposed over an end of the alignment sleeve to limit longitudinal movement of the alignment sleeve; and
    a contact surface disposed against a mating surface of the post.

11. The adapter of claim 10 wherein the cap substantially covers an end of the post, wherein a ferrule contacts the cap during insertion thereof and such contact diminishes contamination upon connecting together the fiber optic connectors by material forming the post.

12. The adapter of claim 11 wherein the post is substantially cylindrical.

13. The adapter of claim 12 wherein the mating surface of the post is substantially frustoconical and disposed on a distal end of the post.

14. The adapter of claim 13 wherein the cap contact surface is substantially frustoconical, wherein the opening of the cap aligns with the through-aperture of the post in response to contact between said frustoconical surfaces.

15. The adapter of claim 14 wherein the end of the post includes a pair of opposing notches formed therein and the cap includes a ring formed about the opening and a pair of opposing latch arms extending from the ring, the frustoconical contact surface of the cap being formed on an inboard side of the ring, the latch arms being disposed within the notches.

16. The adapter of claim 15 wherein each one of the notches and the latch arms include a draft surface that limits radially outward movement of the latch arms.

17. The adapter of claim 16 wherein each one of the notches has a wedge-shape and each one of the latches includes a corresponding wedge-shape, wide portions of the wedge-shapes being oriented radially inward relative to narrow portions thereof, wherein radially outward movement of the latch arms is restricted.

18. The adapter of claim 10 wherein the housing includes a first window formed therein for receiving a first latch of the cap.

19. The adapter of claim 18 wherein the housing comprises a second window and the cap comprises a second latch, the first and second windows disposed substantially equidistant about the post, and the first and second latches disposed on opposing sides of the opening.

20. The adapter of claim 8 wherein the alignment sleeve is capable of rocking within the post and lip, wherein the alignment sleeve is self-aligning in response to insertion of connectors at opposing ends thereof.

21. An adapter for receiving and connecting together a pair of fiber optic connectors, said adapter comprising:
    a housing including a post disposed therein, the post having at least one slot formed therein; and
    a cap disposed over an end of the post, each one the caps including at least one arm disposed in said at least one slot, wherein the cap is at least partially retained by slot.

22. The adapter of claim 21 wherein said post includes a second slot and said cap includes a second arm, each one of said second arms disposed in said second slot.

23. The adapter of claim 22 wherein the post further comprises an opposing end having another pair of slots formed proximate thereto and another cap disposed over the opposing end and having arms disposed in the corresponding slots.

24. The adapter of claim 23 further comprising an alignment sleeve disposed in the post, wherein the alignment sleeve receives a pair of ferrules at opposing ends thereof.

25. The adapter of claim 24 wherein each cap includes an opening formed therein, a lip disposed proximate the opening and disposed over an end of the alignment sleeve to limit longitudinal movement of the alignment sleeve, and a contact surface disposed against a mating surface of the respective post.

26. The adapter of claim 25 wherein each cap substantially covers an end of the post, wherein the ferrule contacts the cap during insertion thereof and such contact diminishes contamination of the fiber optic connection.

27. The adapter of claim 26 wherein the housing and post are integrally formed of a metallic material that is die cast.

28. The adapter of claim 26 wherein the post is substantially cylindrical.

29. The adapter of claim 28 wherein the mating surface of the post is substantially frustoconical and disposed on a distal end of the post.

30. The adapter of claim 29 wherein the cap contact surface is substantially frustoconical, wherein the opening of the cap aligns with the through-aperture of the post in response to contact between said frustoconical surfaces.

31. The adapter of claim 30 wherein the end of the post includes a pair of opposing notches formed therein and the cap includes a ring formed about the opening and a pair of opposing latch arms extending from the ring, the frustoconical contact surface of the cap being formed on an inboard side of the ring, the latch arms being disposed within the notches.

32. The adapter of claim 31 wherein each one of the notches and the latch arms include a draft surface that limits radially outward movement of the latch arms.

33. The adapter of claim 31 wherein each one of the notches has a wedge-shape and each one of the latches includes a corresponding wedge-shape, wide portions of the wedge-shapes being oriented radially inward relative to narrow portions thereof, wherein radially outward movement of the latch arms is restricted.

34. The adapter of claim 26 wherein the housing further comprises a bulkhead disposed therein, the bulkhead including a first window formed therein for receiving the first latch.

35. The adapter of claim 34 wherein the bulkhead comprises a second window and the cap comprises a second latch, the first and second windows disposed substantially equidistant about the post, and the first and second latches disposed on opposing sides of the opening.

* * * * *